US012720284B2

(12) United States Patent
Cruz et al.

(10) Patent No.: US 12,720,284 B2
(45) Date of Patent: Aug. 25, 2026

(54) PORTABLE NETWORK ROUTER SYSTEM

(71) Applicant: Board of Regents, The University of Texas System, Austin, TX (US)

(72) Inventors: Daniel Cruz, El Paso, TX (US); Craig Tweedie, El Paso, TX (US); Gesuri Ramirez-Garcia, El Paso, TX (US)

(73) Assignee: The University of Texas at El Paso, Austin, TX (US)

( * ) Notice: Subject to any disclaimer, the term of this patent is extended or adjusted under 35 U.S.C. 154(b) by 78 days.

(21) Appl. No.: 18/821,210

(22) Filed: Aug. 30, 2024

(65) Prior Publication Data

US 2025/0133375 A1 Apr. 24, 2025

Related U.S. Application Data

(60) Provisional application No. 63/591,218, filed on Oct. 18, 2023.

(51) Int. Cl.
*H04W 4/38* (2018.01)
*H04L 41/0803* (2022.01)

(52) U.S. Cl.
CPC ........... *H04W 4/38* (2018.02); *H04L 41/0803* (2013.01)

(58) Field of Classification Search
CPC ............................ H04W 4/38; H04L 41/0803
USPC .......................................................... 709/224
See application file for complete search history.

(56) References Cited

U.S. PATENT DOCUMENTS 8,438,249 B2 * 5/2013 Urano ........................ G06F 1/14 709/224
8,724,490 B2 * 5/2014 Drake ....................... H02J 3/14 370/467
9,739,762 B2 8/2017 Schmidlin et al.
9,774,497 B2 * 9/2017 Britt ...................... H04L 12/283
9,959,374 B2 5/2018 Rosti et al.
10,135,681 B2 * 11/2018 Chan ..................... H04L 67/303
10,157,058 B2 * 12/2018 Malladi ................. G06F 3/0679
10,862,950 B2 * 12/2020 Garner .................. H04L 67/025
11,627,062 B2 * 4/2023 Banerjee ............. H04L 41/0873 709/224
12,040,941 B2 * 7/2024 Chan ................... H04L 41/0843
12,457,127 B2 * 10/2025 Polar Seminario .... G01D 4/004
2002/0191553 A1 * 12/2002 Lehr ......................... G05F 1/66 370/318
2004/0037300 A1 * 2/2004 Lehr ....................... H04L 12/10 370/401
2004/0180692 A1 * 9/2004 Yang .................... H04B 1/3877 455/557
2005/0275530 A1 * 12/2005 Kates ....................... G08B 1/08 340/539.22

(Continued)

FOREIGN PATENT DOCUMENTS

GB 2460174 A * 11/2009 ............. G08C 17/04
WO WO-03100559 A2 * 12/2003 ......... H04L 63/1441

*Primary Examiner* — Anthony Mejia
(74) *Attorney, Agent, or Firm* — Yee & Associates, P.C.

(57) ABSTRACT

A portable network router system for communicating with a remote sensor is provided. The system comprises a transceiver configured to transmit and receive radio signals, and comprises a storage device configured to store program instructions and downloaded data. The system comprises a random access memory configured to temporarily store program instructions. The system comprises one or more processors operably coupled to the random access memory, the storage device and the transceiver.

17 Claims, 5 Drawing Sheets

(56) References Cited

U.S. PATENT DOCUMENTS

| | | | | |
|---|---|---|---|---|
| 2006/0179158 | A1* | 8/2006 | Randriamasy | H04L 45/60 709/238 |
| 2010/0201542 | A1* | 8/2010 | Harnett | H04L 67/12 340/870.28 |
| 2012/0106411 | A1* | 5/2012 | Tseng | H04L 61/5061 370/310 |
| 2012/0236770 | A1* | 9/2012 | Yeh | H04W 52/0206 370/328 |
| 2015/0373555 | A1* | 12/2015 | Xu | H04W 4/02 370/254 |
| 2017/0054596 | A1* | 2/2017 | Murray | H04L 41/0816 |
| 2017/0308494 | A1* | 10/2017 | Johnson | G06F 13/4068 |
| 2022/0191284 | A1 | 6/2022 | Cella et al. | |
| 2022/0386089 | A1* | 12/2022 | Rizk | H04W 4/38 |
| 2023/0362197 | A1* | 11/2023 | Condon | H04L 65/765 |
| 2025/0030270 | A1* | 1/2025 | Hood | H02J 50/001 |
| 2025/0133375 | A1* | 4/2025 | Cruz | H04L 41/0803 |

* cited by examiner

PORTABLE NETWORK ROUTER SYSTEM

CROSS-REFERENCE TO RELATED APPLICATION

This application claims the benefit of U.S. Provisional Patent Application Ser. No. 63/591,218, filed Oct. 18, 2023, and entitled "Portable Network Router System," which is incorporated herein by reference in its entirety.

BACKGROUND INFORMATION

1. Field

The present disclosure relates generally to network routers, and more specifically to a portable network router system for communicating with a remote sensor.

2. Background

Remote sensors, such as cameras, temperature sensors, radiation sensors, environmental sensors, and ecological sensors, play a crucial role in various fields. Remote sensors are used to collect data in remote and challenging environments. These sensors are often deployed in remote and inaccessible areas, making reliable communication a significant challenge.

Several obstacles hinder the effective use of the remote sensors. Remote sensors have limited connectivity because they are frequently deployed in areas lacking cellular service or internet access, rendering them isolated from conventional communication networks. Remote sensors are often incompatible with traditional internet routers, making it difficult for them to transmit data to connected devices. Due to the absence of internet service (e.g., WiFi or ethernet), remote sensors cannot share collected data with centralized systems or other connected devices.

Furthermore, many remote sensors are designed to conserve power and may enter lower power modes after a short period, complicating troubleshooting efforts and remote sensor configuration. The inability to configure remote sensors to prevent them from entering lower power modes presents a significant challenge, as it limits the sensors' responsiveness and reliability.

SUMMARY

Illustrative embodiments provide a portable network router system for communicating with a remote sensor. In an illustrative embodiment, a system comprises a power supply configured to provide a regulated DC voltage. The system comprises a clock configured to receive the regulated DC voltage and to provide a clock signal. The system comprises a transceiver configured to receive the DC voltage and the clock signal and configured to transmit and receive radio signals. The system comprises a storage device configured to store program instructions and downloaded data. The system comprises a random access memory configured to temporarily store program instructions. The system comprises one or more processors operably coupled to the random access memory, the storage device and the transceiver.

In an illustrative embodiment, the one or more processors are configured to execute the program instructions to load the program instructions from the storage device in the random access memory, manage communication with the remote sensor, download data from the remote sensor and store the downloaded data in the storage device.

In an illustrative embodiment, the one or more processors execute the program instructions to configure transceiver's settings.

In an illustrative embodiment, the one or more processors execute the program instructions to synchronize the remote sensor with the system.

In an illustrative embodiment, the one or more processors execute the program instructions to cause the transceiver to download data from the remote sensor.

In an illustrative embodiment, the one or more processors execute the program instructions to cause the system to update the clock over the Internet using a network time protocol (NTP).

In an illustrative embodiment, the one or more processors execute the program instructions to cause the transceiver to transmit a first radio signal to transition the remote sensor from a power saving mode to an active mode.

In an illustrative embodiment, the one or more processors execute the program instructions to cause the transceiver to synchronize the remote sensor with the system prior to downloading the data.

In an illustrative embodiment, the system comprises an ethernet port coupled to the one or more transceivers. The ethernet port is configured to communicate with the remote sensor and the Internet over a wired local network connections.

In an illustrative embodiment, the system comprises a battery coupled to the power supply and configured to provide an unregulated DC voltage to the power supply.

An illustrative embodiment provides a computer-implemented method of communication between a portable network router system and a remote sensor. The method comprises establishing a WiFi network to enable wireless communication between the router system and the remote sensor; transitioning the remote sensor from a power saving mode to an active mode; synchronizing the remote sensor with the portable router system; and downloading data from the remote sensor.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. The illustrative embodiments recognize and take into account that remote sensors have limited connectivity because they are frequently deployed in areas lacking cellular service or internet access, rendering them isolated from conventional communication networks.

The illustrative embodiments recognize and take into account that remote sensors are often incompatible with traditional internet routers, making it difficult for them to transmit data to connected devices. Due to the absence of internet service (e.g., WiFi or Ethernet), remote sensors cannot share collected data with centralized systems or other connected devices.

The illustrative embodiments recognize and take into account that many remote sensors are designed to conserve power and may enter lower power modes after a short period, complicating troubleshooting efforts and remote sensor configuration. The inability to configure remote sensors to prevent them from entering lower power modes presents a significant challenge, as it limits the sensors' responsiveness and reliability.

The illustrative embodiments provide a network router system. The network router system is a portable device configured to communicate with remote sensors in areas lacking wireless cellular or internet connectivity. Remote sensors can, for example, include time lapse cameras, micrometeorological sensors, air samplers, and other sensors/sensing systems. The network router system acts as a bridge between remote sensors and connected devices, allowing seamless data transmission even in remote, off-grid locations.

Figure 1:
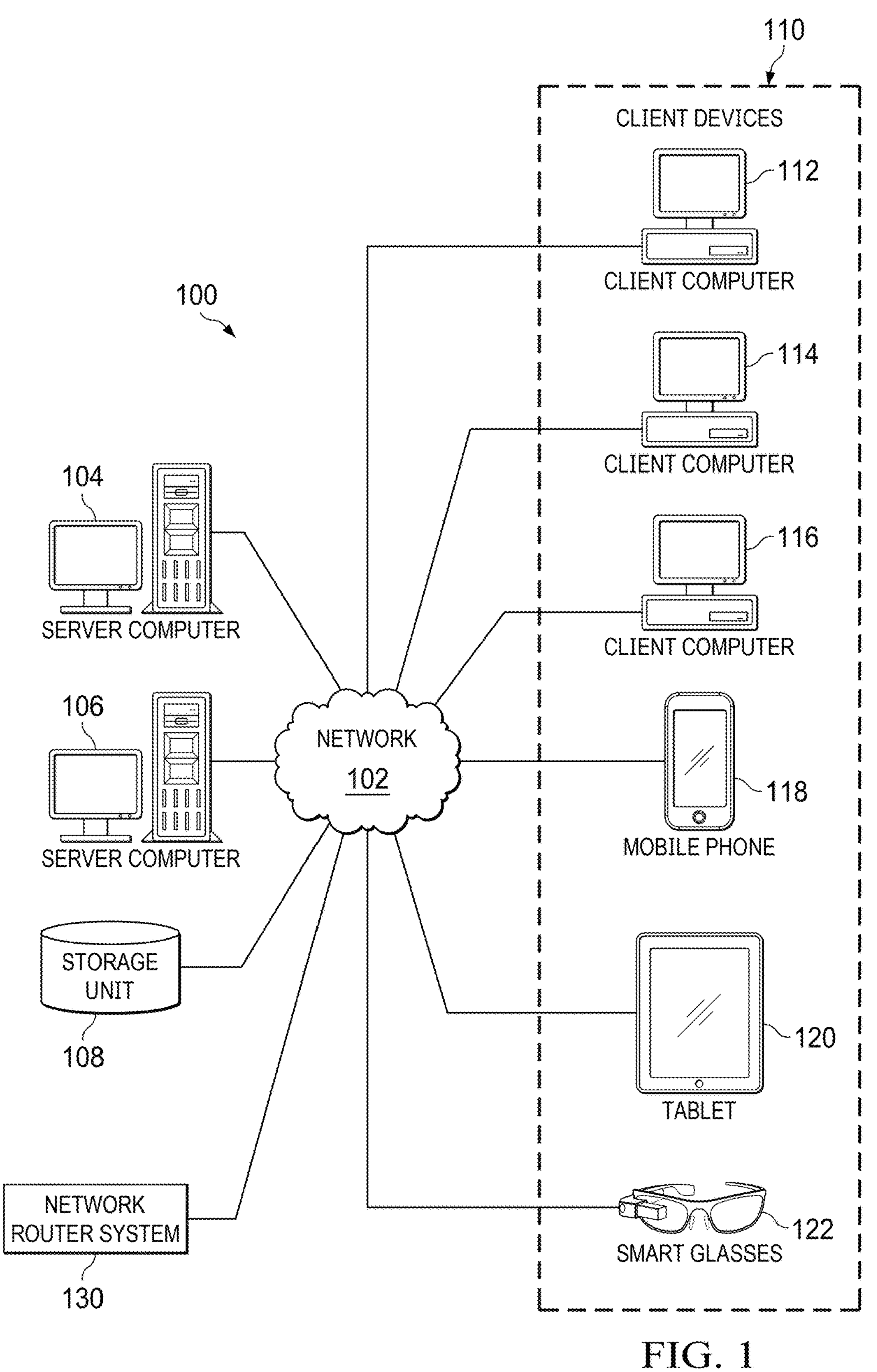
FIG. 1 is a pictorial representation of a network of data processing system in which illustrative embodiments may be implemented.

With reference to FIG. 1, a pictorial representation of a network of data processing system is depicted in which illustrative embodiments may be implemented. Network data processing system 100 is a network of computers in which the illustrative embodiments may be implemented. Network data processing system 100 contains network 102, which is the medium used to provide communications links between various devices and computers connected within network data processing system 100. Network 102 may include connections, such as wire, wireless communication links, or fiber optic cables.

In the depicted example, server computers 104 and 106 and storage unit 108 connect to network 102. In addition, client devices 110 connect to network 102. In the depicted example, server computer 104 provides information, such as boot files, operating system images, and applications to client devices 110. Client devices 110 can be, for example, computers, workstations, or network computers. As depicted, client devices 110 include client computers 112, 114, and 116. Client devices 110 can also include other types of client devices such as mobile phone 118, tablet computer 120, and smart glasses 122. In addition, network router system 130 is connected to network 102. In some example embodiments, network router system 130 is a portable device configured to communicate with remote sensors in areas lacking reliable wireless cellular or internet connectivity. Remote sensors can, for example, include time lapse cameras, micrometeorological sensors, air samplers, and other sensors/sensing systems. Network router system 130 acts as a bridge between remote sensors and connected devices, allowing seamless data transmission even in remote, off-grid locations.

In the illustrative example of FIG. 1, server computers 104 and 106, storage unit 108, client devices 110 and network router system 130 are network devices that connect to network 102 in which network 102 is the communications media for these network devices. Some or all of client devices 110 and network router system 130 may form an Internet of things (IoT) in which these physical devices can connect to network 102 and exchange information with each other over network 102.

Program code located in network data processing system 100 can be stored on a computer-recordable storage medium and downloaded to a data processing system or other device for use. For example, the program code can be stored on a computer-recordable storage medium on server computers 104 and 106 and storage unit 108 and downloaded to client devices 110 and network router system 130 over network 102.

In the illustrative example of FIG. 1, network 102 can be the Internet representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using different types of networks. For example, network 102 can be comprised an intranet, a local area network (LAN), a metropolitan area network (MAN), or a wide area network (WAN). In other example implementations, network 102 can be a wireless cellular network. FIG. 1 is intended as an example, and not as an architectural limitation for the different illustrative embodiments.

Figures 2, 3:
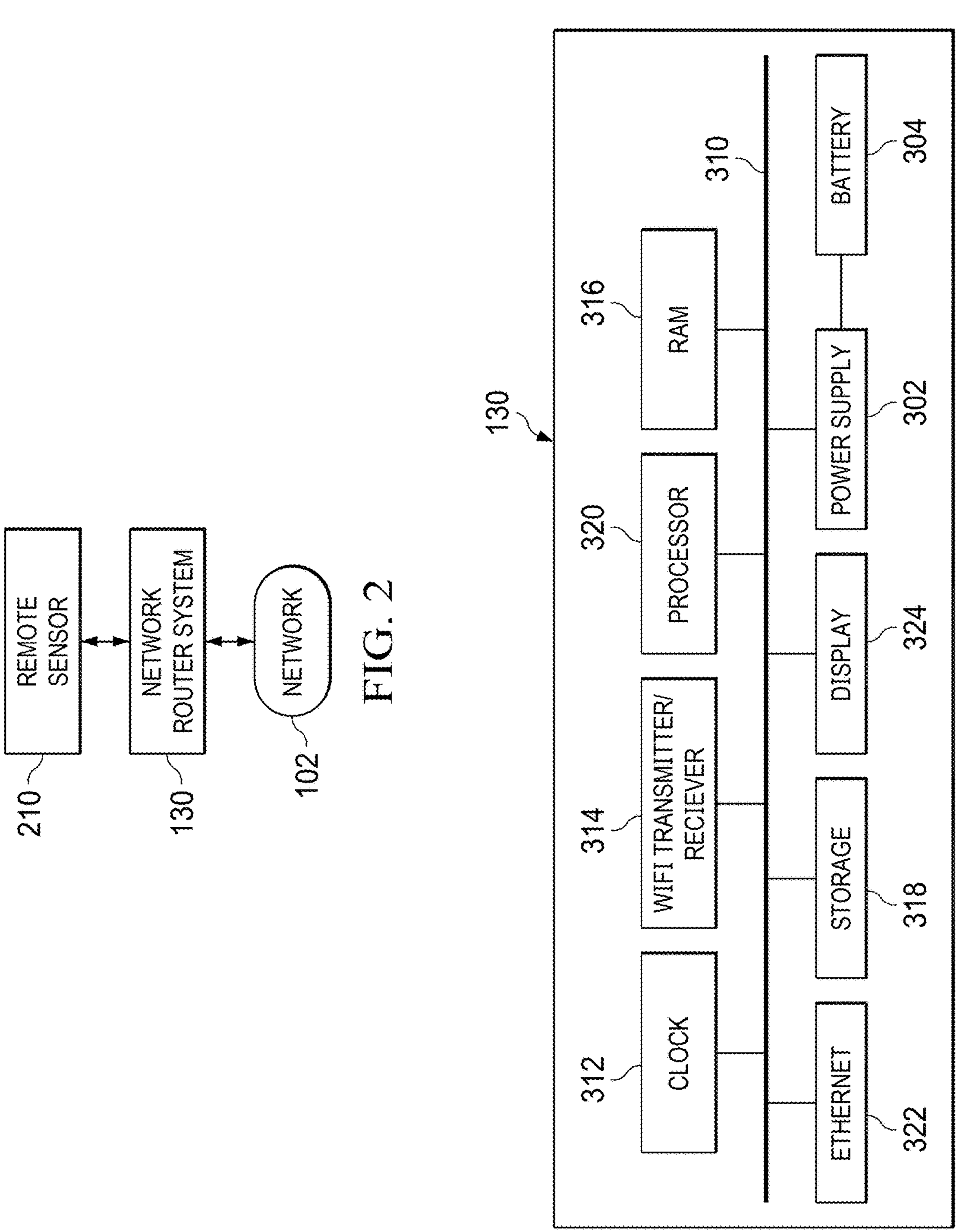
FIG. 2 depicts a network router system in communication with a remote sensor in accordance with an illustrative embodiment.
FIG. 3 illustrates a block diagram of a network router system in accordance with an illustrative embodiment.

FIG. 2 depicts network router system 130 in communication with remote sensor 210 and network 102. Remote sensor 210 can, for example, include time lapse cameras, micrometeorological sensors, temperature sensors, air samplers, and other sensors/sensing systems. Remote sensor 210 collects data in remote and challenging environments. Remote sensor 210 has limited connectivity because it is deployed in areas lacking cellular service or internet access, rendering remote sensor 210 isolated from conventional communication networks.

In some example embodiments, network router system 130 is a portable device configured to communicate with remote sensor 210. Network router system 130 is equipped with advanced communication capabilities, enabling it to establish a local area network (LAN) such as a WiFi network over which remote sensor 210 can communicate wirelessly with network router system 130. In other example embodiments, network router system 130 can communicate with remote sensor over an ethernet connection (not shown in FIG. 2). Network router system 130 can download data from remote sensor 210, update remote sensor 210's clock, download device firmware, send remote sensor 210's status report. Also, network router system 130 can reconfigure remote sensor 210 and provide software updates. In some example embodiments, network router system 130 provides software updates to remote sensors via a wireless or a wired network connection.

Furthermore, network router system 130 acts as a bridge between remote sensor 210 and network 102 (e.g., Internet or cellular network). Thus, network router system 130 allows remote sensor 210 to transmit data to server computers 104, 106, and client devices 110. By acting as a bridge between remote sensor 210 and server computers 104, 106 and client devices 110, network router system 130 allows seamless data transmission even in remote, off-grid locations.

FIG. 3 illustrates a block diagram of network router system 130 in accordance with an illustrative embodiment. In some embodiments, network router system 130 is a portable device configured to communicate with remote sensor 210. Network router system 130 is self-powered and is equipped with advanced communication capabilities, enabling it to establish a local area network (LAN) such as a Wifi network over which remote sensor 210 can communicate wirelessly with network router system 130. In other example embodiments, network router system 130 can communicate with remote sensor over an ethernet connection.

With reference to FIG. 3, network router system 130 includes power supply 302 adapted to provide a regulated DC voltage (e.g., 5V, 10V, 25V) to system 130. In some example embodiments, power supply 302 is a switched mode DC-DC regulator that converts an unregulated DC voltage to a regulated DC voltage. System 130 includes battery 304 which can provide an unregulated DC voltage to power supply 302 even when system 130 is powered off. As such, system 130 is a self-powered device. Power supply 302 converts the unregulated DC voltage into a regulated DC voltage which is coupled to bus 110. In the illustrative embodiment, bus 110 can be a common channel through which various signals, data and power can be transmitted between different components or devices within system 130.

System 130 includes a clock 312 coupled to bus 310. Clock 312 receives the DC voltage over bus 310 and in response generates a clock signal (e.g., 100 MHz to around 800 MHZ). In the illustrative embodiment, clock 312 is a high-precision clock which provides the clock signal to different components or devices within system 130. In some example embodiments, a second battery (not shown in FIG. 3) can be utilized to provide power to clock 312, thus ensuring clock 312 can continue maintain precise time and date even when system 130 is powered off. The clock signal generated by clock 312 is also used to synchronize remote sensor 210 with system 130 to allow seamless data transmission from remote sensor 210 to system 130. In an illustrative embodiment, a network time protocol (NTP) service is used by system 130 to synchronize remote sensor 210 with system 130 and to maintain accurate time across all networked devices. NTP ensures that all devices on a network agree on a common time reference, which is necessary for accurate time synchronization for timestamping network events and data, security protocols and efficient data transmission.

System 130 includes transceiver 314 coupled to bus 310. In an illustrative embodiment, transceiver 314 is a WiFi transceiver operating at a frequency range of between around 2 GHz to around 7 GHZ. Transceiver 314 receives the DC voltage, internal clock signal and a control signal. In response, transceiver 314 transmits a radio signal to synchronize remote sensor 210 with system 130 and downloads data from remote sensor 210.

System 130 includes memory 316 which in an illustrative embodiment is a random access memory (RAM). RAM 316 is a volatile memory which allows for fast and temporary storage of data and program instructions. System 130 includes storage device 318 configured to store program instructions and data. In an illustrative embodiment, storage device 318 is a non-volatile storage such as a hard drive or a solid state drive.

System 130 includes one or more processors 320 coupled to random access memory 316, storage device 318 and transceiver 314. When system 130 is powered up, processors 320 load program instructions from storage device 318 into RAM 316. In an illustrative embodiment, each instruction in a program is assigned a memory address in RAM 316.

In operation, processors 320 fetch the program instructions from RAM 316, decode the program instructions and executes the instructions to manage communication with external devices such as remote sensor 210. For example, processors 320 may execute the instructions to configure transceiver 314's settings and manage transceiver 314. Processors 320 may execute instructions to configure transceiver 314's modulation schemes, frequency channels, power levels and data packets for transmission. Processors 320 may execute instructions to configure transceiver 314's settings to initiate synchronization with remote sensor 210 and prepare to receive incoming data.

In an illustrative embodiment, system 130 includes ethernet port 322 that allows connection to an ethernet cable. Ethernet port 322 provides wired local network connections, providing a reliable and high-speed method for system 130 to communicate with remote sensor 210, synchronize and configure remote sensor 210 and download data from remote sensor 210. Ethernet port 322 also allows system 130 to transmit data over an ethernet connection to server computers 104, 106 and client devices 110, and thus enables system 130 to act as a bridge between remote sensor 210 and server computers 104, 106 and client devices 110. When system 130 is connected to the Internet via ethernet port 322, system 130 updates clock 312 using a network time protocol (NTP).

System 130 includes display 324 coupled to bus 310. Display 324 can be a monitor or a screen. Display 324 allows system 130 to visually present information generated by system 130. Display 324 can also serve as a user interface for interacting with system 130 and viewing contents. In some example embodiments, display 324 is a removable display which can be connected to system 130.

Figure 4:
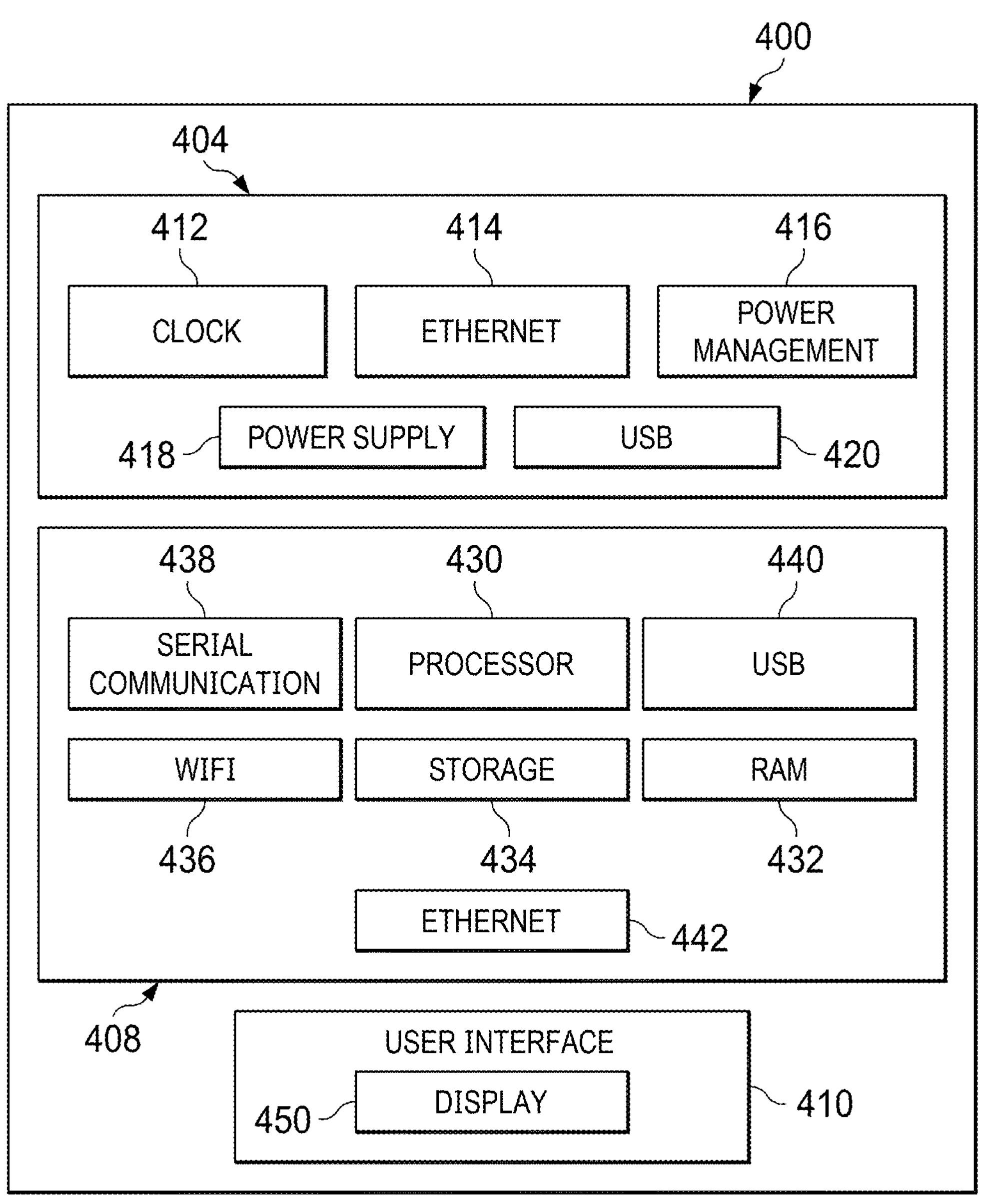
FIG. 4 illustrates an example implementation of a network router system.

FIG. 4 illustrates an example implementation of network router system 400 in accordance with an illustrative embodiment. Network router system 400 is a portable device configured to communicate with remote sensor 210. Network router system 400 is self-powered and is equipped with advanced communication capabilities, enabling it to establish a local area network (LAN) such a WiFi network over which remote sensor 210 can as communicate wirelessly with network router system 400. Network router system 400 can also communicate with remote sensor 210 over an ethernet connection.

With reference to FIG. 4, network router system 400 includes power module 404, processor and communication module 408 and user interface module 412. Module 404 includes clock 412. Clock 412 receives a DC voltage and in response generates a clock signal (e.g., 100 MHz to around 800 MHz). In the illustrative embodiment, clock 412 is a high-precision clock which provides the clock signal to different components or devices within system 400.

Module 404 includes ethernet port 414 that allows connection to an ethernet cable. Ethernet port 414 provides wired local network connections, providing a reliable and high-speed method for system 400 to communicate with remote sensor 210, synchronize and configure remote sensor 210 and download data from remote sensor 210.

Module 404 includes power management circuit 416 which is a hardware component configured to efficiently manage the power consumption and distribution within system 400. Power management circuit 416 optimizes the use of electrical power, enhances energy efficiency, and controls various power-related functions to ensure system 400 operates reliably and conserves energy. Power management circuit 416 can provide thermal management by controlling cooling mechanisms, such as fans or heat sinks, to manage system 400's temperature and prevent overheating.

Module 404 includes power supply 418 adapted to provide a regulated DC voltage (e.g., 5V, 10V, 25V) to system 400. In some example embodiments, power supply 418 is a switched mode DC-DC regulator that converts an unregulated DC voltage to a regulated DC voltage. System 400 can include a battery (not shown in FIG. 4) which can provide an unregulated DC voltage to power supply 418.

Module 404 includes universal serial bus (USB) port 420. USB port 420 is a hardware interface that serves as a standardized connection point for attaching and communicating with USB devices. USB port 420 can be used for connecting a variety of peripherals, transferring data, and supplying power. USB port 420 facilitates high-speed data transfer between system 400 and connected USB devices. USB port 420 can also provide electrical power, allowing connected devices to draw power from system 400.

Processor and communication module 408 includes one or more processors 430, a random access memory (RAM) 432, storage device 434 and WiFi transceiver 436. RAM 432 is a volatile memory which allows for fast and temporary storage of data and program instructions. Storage device 434 is a non-volatile storage such as a hard drive or a solid state drive. In an illustrative embodiment, transceiver 438 operates at a frequency range of between around 2 GHz to around 7 GHz.

When system 400 is powered up, processors 430 load program instructions from storage device 434 into RAM 432. In operation, processors 430 fetch the program instructions from RAM 432, decode the program instructions and execute the instructions to manage communication with external devices such as remote sensor 210. For example, processors 430 may execute the instructions to configure transceiver 436's settings and control transceiver 436. Processors 430 may execute instructions to configure transceiver 436's modulation schemes, frequency channels, power levels and data packets for transmission. Similarly, processors 430 may execute instructions to configure transceiver 436's settings to initiate synchronization with remote sensor 210 and prepare to receive incoming data.

Module 408 includes serial communication port 438 which is a hardware interface used for transmitting and receiving data one bit at a time, sequentially, over a single communication line. Serial communication port 438 can send/receive data sequentially over a single wire or a communication channel. Serial communication port 438 can send/receive data asynchronously or synchronously. In asynchronous communication, data is transmitted with start and stop bits to frame each byte, allowing the sender and receiver to operate independently. In synchronous communication, a shared clock signal is used to synchronize data transmission. In some example embodiments, as additional features, module 408 includes USB port 440 and ethernet port 442 which are similar to the respective USB port 420 and ethernet port 414 of module 404.

System 400 includes user interface (UI) 410 for interacting with system 400 and viewing contents. UI 410 includes display 450 which can be a monitor or a screen. Display 450 allows system 400 to visually present information generated by system 400.

Figure 5:
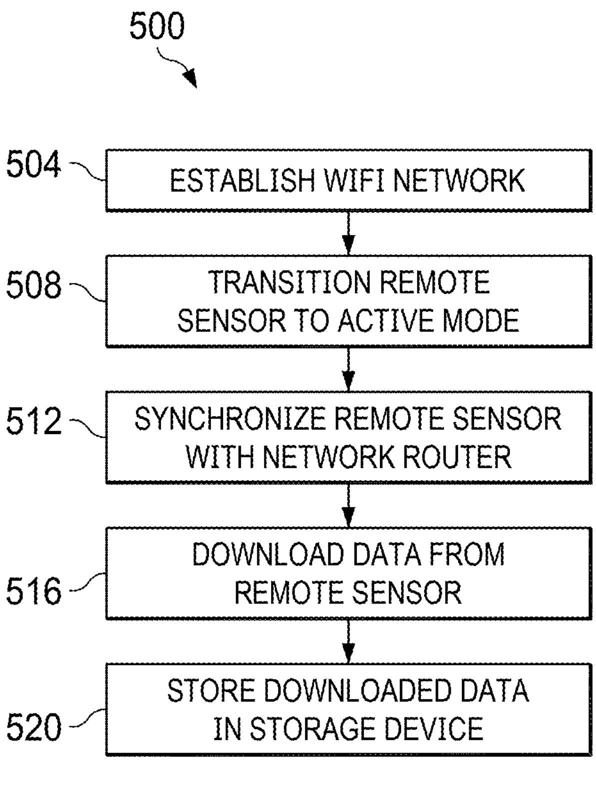
FIG. 5 is a flowchart of a process 500 communication between a network router system and a remote sensor.

With reference to FIG. 5, a flowchart of process 500 for communication between a portable network router system and a remote sensor is depicted. A WiFi network is established by network router 130 to enable wireless communication with remote sensor 210 (step 504).

Remote sensor 210 is then transitioned from a power saving mode to an active mode (step 508). In an illustrative embodiment, network router 130 transmits a first radio signal to cause remote sensor 210 to transition to the active mode.

At step 512, remote sensor 210 is synchronized with network router 130. In an illustrative embodiment, a network time protocol (NTP) service is used by router system 130 to synchronize remote sensor 210 with system 130 and to maintain accurate time across all networked devices.

At step 516, network router 130 downloads data from remote sensor 210. The downloaded data is stored in a storage device in network router 130 (step 520).

Figure 6:
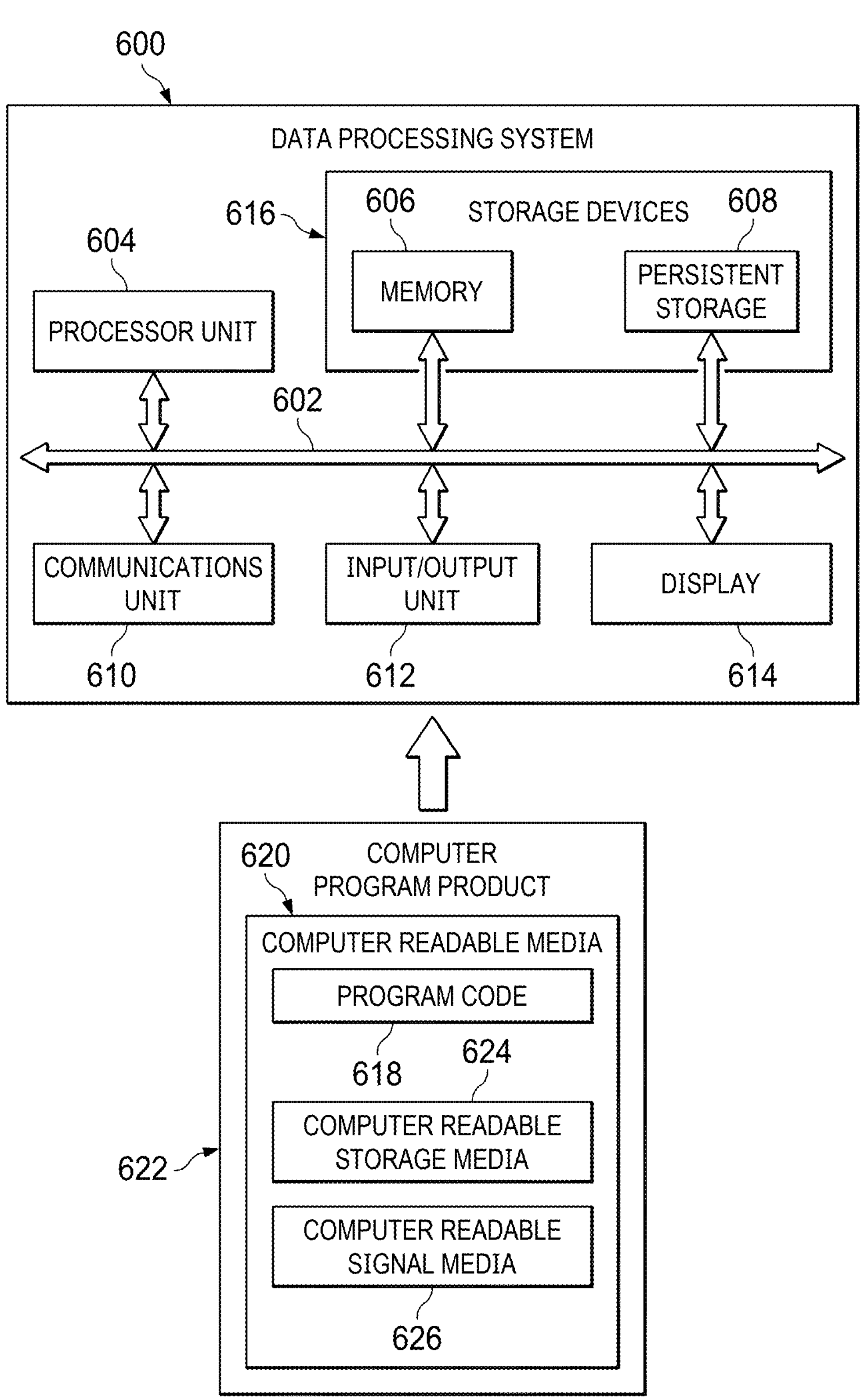
FIG. 6 illustrates a block diagram of a data processing system in accordance with an illustrative embodiment.

Turning now to FIG. 6, an illustration of a block diagram of a data processing system is depicted in accordance with an illustrative embodiment. Data processing system 600 may be used to implement server computers 104 and 106 and network router 130. For example, network router 130 may be implemented with some or all of the components of system 600.

In this illustrative example, data processing system 600 includes communications framework 602, which provides communications between processor unit 604, memory 606, persistent storage 608, communications unit 610, input/output unit 612, and display 614. In this example, communications framework 602 may take the form of a bus system.

Processor unit 604 serves to execute instructions for software that may be loaded into memory 606. Processor unit 604 may be a number of processors, a multi-processor core, or some other type of processor, depending on the particular implementation. In an embodiment, processor unit 604 comprises one or more conventional general-purpose central processing units (CPUs). In an alternate embodiment, processor unit 604 comprises one or more graphical processing units (GPUS).

Memory 606 and persistent storage 608 are examples of storage devices 616. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 616 may also be referred to as computer-readable storage devices in these illustrative examples. Memory 606, in these examples, may be, for example, a random access memory or any other suitable volatile or non-volatile storage device. Persistent storage 608 may take various forms, depending on the particular implementation.

For example, persistent storage 608 may contain one or more components or devices. For example, persistent storage 608 may be a hard drive, a flash memory, a rewritable optical disk, a rewritable magnetic tape, or some combination of the above. The media used by persistent storage 608 also may be removable. For example, a removable hard drive may be used for persistent storage 608. Communications unit 610, in these illustrative examples, provides for communications with other data processing systems or devices. In these illustrative examples, communications unit 610 is a network interface card.

Input/output unit 612 allows for input and output of data with other devices that may be connected to data processing system 600. For example, input/output unit 612 may provide a connection for user input through at least one of a keyboard, a mouse, or some other suitable input device. Further, input/output unit 612 may send output to a printer. Display 614 provides a mechanism to display information to a user.

Instructions for at least one of the operating system, applications, or programs may be located in storage devices 1016, which are in communication with processor unit 604 through communications framework 602. The processes of the different embodiments may be performed by processor unit 604 using computer-implemented instructions, which may be located in a memory, such as memory 606.

These instructions are referred to as program code, computer-usable program code, or computer-readable program code that may be read and executed by a processor in processor unit 604. The program code in the different embodiments may be embodied on different physical or computer-readable storage media, such as memory 1006 or persistent storage 608.

Program code 618 is located in a functional form on computer-readable media 620 that is selectively removable and may be loaded onto or transferred to data processing system 600 for execution by processor unit 604. Program code 618 and computer-readable media 620 form computer program product 622 in these illustrative examples. In one example, computer-readable media 620 may be computer-readable storage media 624 or computer-readable signal media 626.

In these illustrative examples, computer-readable storage media 624 is a physical or tangible storage device used to store program code 618 rather than a medium that propagates or transmits program code 618. Computer readable storage media 624, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 618 may be transferred to data processing system 600 using computer-readable signal media 626. Computer-readable signal media 626 may be, for example, a propagated data signal containing program code 618. For example, computer-readable signal media 626 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 600 are not meant to provide architectural limitations to the manner in which different embodiments may be implemented. The different illustrative embodiments may be implemented in a data processing system including components in addition to or in place of those illustrated for data processing system 100. Other components shown in FIG. 10 can be varied from the illustrative examples shown. The different embodiments may be implemented using any hardware device or system capable of running program code 618.

As used herein, "a number of," when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A portable network router system for communicating with a remote sensor, the system comprising:
   a power supply configured to provide a regulated DC voltage;
   a clock configured to receive the regulated DC voltage and to provide a clock signal;
   a transceiver configured to receive the DC voltage and the clock signal and configured to transmit and receive radio signals;
   a storage device configured to store program instructions and downloaded data;
   a random access memory configured to temporarily store program instructions; and
   one or more processors operably coupled to the random access memory, the storage device and the transceiver, the one or more processors configured to execute the program instructions to load the program instructions from the storage device in the random access memory, manage communication with the remote sensor, download data from the remote sensor and store the downloaded data in the storage device.

2. The system of claim 1, wherein the one or more processors execute the program instructions to configure the transceiver's settings.

3. The system of claim 1, wherein the one or more processors execute the program instructions to synchronize the remote sensor with the system.

4. The system of claim 1, wherein the one or more processors execute the program instructions to cause the transceiver to download data from the remote sensor.

5. The system of claim 1, wherein the one or more processors execute the program instructions to cause the system to update the clock over the Internet using a network time protocol (NTP).

6. The system of claim 1, wherein the one or more processors execute the program instructions to cause the transceiver to transmit a first radio signal to transition the remote sensor from a power saving mode to an active mode.

7. The system of claim 1, wherein the transceiver operates at a frequency range of between 2 GHz and 7 GHz.

8. The system of claim 1, wherein the one or more processors execute the program instructions to cause the transceiver to synchronize the remote sensor with the system prior to downloading the data.

9. The system of claim 1, further comprising an ethernet port coupled to the transceiver, the ethernet port configured to communicate with the remote sensor and the Internet over a wired local network connections.

10. The system of claim 1, further comprising a battery coupled to the power supply and configured to provide an unregulated DC voltage to the power supply.

11. A portable network router system for communication with a remote sensor, the system comprising:
   a power supply configured to provide a regulated DC voltage;
   a battery coupled to the power supply and configured to provide an unregulated DC voltage to the power supply;
   a clock adapted to receive the regulated DC voltage and to provide a clock signal;
   a transceiver configured to receive the DC voltage and the clock signal and configured to transmit and receive radio signals;
   a storage device configured to store program instructions and downloaded data;
   a random access memory configured to temporarily store program instructions;
   one or more processors operably coupled to the random access memory, the storage device and the transceiver, the one or more processors configured to execute the program instructions to load the program instructions from the storage device in the random access memory, manage communication with the remote sensor, download data from the remote sensor and store the downloaded data in the storage device; and
   an ethernet port coupled to the one or more processors, the ethernet port configured to communicate with the remote sensor and the Internet over a wired local network connections.

12. The system of claim 11, wherein the one or more processors execute the program instructions to configure transceiver's settings.

13. The system of claim 11, wherein the one or more processors execute the program instructions to synchronize the remote sensor with the system.

14. The system of claim 11, wherein the one or more processors execute the program instructions to cause the system to update the clock over the Internet using a network time protocol (NTP).

15. The system of claim 11, wherein the one or more processors execute the program instructions to cause the remote sensor to transition from a power saving mode to an active mode.

16. The system of claim 11, wherein the transceiver operates at a frequency range of between around 2 GHz and around 7 GHz.

17. The system of claim 11, wherein the one or more processors execute the program instructions to cause the transceiver to synchronize the remote sensor with the system prior to downloading the data.

* * * * *